Nov. 9, 1965   W. B. SILVERMAN   3,216,812
APPARATUS FOR SKIMMING AND STIRRING MOLTEN GLASS
Filed April 2, 1962

*INVENTOR.*
WILLIAM B. SILVERMAN
BY
J. R. NELSON
& W. A. SCHAICH
ATTORNEYS

United States Patent Office

3,216,812
APPARATUS FOR SKIMMING AND STIRRING MOLTEN GLASS
William B. Silverman, Metuchen, N.J., assignor to Owens-Illinois Glass Company, a corporation of Ohio
Filed Apr. 2, 1962, Ser. No. 184,423
1 Claim. (Cl. 65—179)

This invention relates generally to a method and apparatus for conditioning molten glass during its flow through a channel and more particularly to skimming, stirring and recirculating the molten glass during such flow.

In the manufacture of glass articles, it is essential that the molten glass which is delivered from the furnace to the molding apparatus have a relatively homogeneous temperature and composition. According to many of the conventional methods of manufacturing glass articles, glass from the melting furnace is passed through a forehearth for conditioning prior to delivery to the molding apparatus. It is well known in the art that the upper surface of molten glass flowing through such furnace forehearth tends to become cooler than the rest of the glass flowing therethrough. If permitted to flow directly to the delivery outlet of the furnace forehearth, such cooler glass would seriously impair the quality of any product formed therefrom. Likewise, glass contacting the bottom and sides of the channel of the forehearth tends to assume a different composition from that of the rest of the molten glass as a result of contamination from refractories going into solution. This glass would also impair the quality of a formed article if it were permitted to flow directly to the delivery outlet.

Accordingly, it is an object of this invention to prevent the direct flow of either strata of surface or bottom glass to the delivery outlet of a furnace forehearth.

A further object of this invention is to provide a method and apparatus for skimming, stirring, and recirculating molten glass in a furnace forehearth in such manner that glass passing through the delivery outlet will have the desired degree of homogeneity and temperature uniformity.

Other objects and advantages of this invention will become apparent to those skilled in the art from the following detailed description taken in conjunction with the following drawings in which.

According to this invention, the cooler surface portion of molten glass flowing through the channel of a forehearth is skimmed by a baffle which permits only the lower glass to flow thereunder. Flow of the lower glass is then impeded by a dam positioned downstream from said baffle and cooperating therewith to form a pocket. A pump which serves both to stir and raise the molten glass is positioned in said pocket and operates to flow the molten glass upward at a greater rate than it can be received downstream over said dam, thereby causing a substantial portion to flow upstream over the top of said baffle for recirculation through said pocket.

Figure 1:
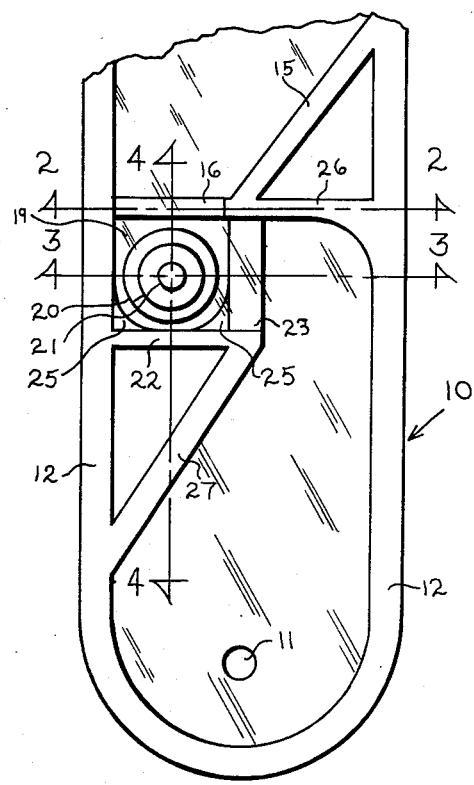
FIG. 1 is a plan view of a furnace forehearth showing one form of the apparatus of this invention as positioned therein.

There is shown in FIG. 1 a furnace forehearth, generally designated 10, having an outlet 11 through which the molten glass passes for delivery to molding apparatus (not shown). The forehearth 10 has side walls 12 and a bottom 13 which cooperate to form a channel through which the molten glass flows. The depth of the molten glass in the channel is substantially constant and is indicated by the number 14.

A baffle 16 is positioned in the channel at substantially right angles to side walls 12 and the direction of flow of the molten glass. The top surface 17 of the baffle 16 is somewhat lower than the level 14 of the molten glass. The bottom edge 18 of baffle 16 is substantially above the bottom 13 of the forehearth 10 to permit the flow thereunder of the molten glass. As a preferred example in a wide channel forehearth, the baffle 16 is shown as extending approximately one-half the width of the forehearth 10. Therefore, in order to prevent the formation of any pockets in which the molten glass could become stagnated, there is provided a divergent wall 15 which is positioned between the end of the baffle 16 and a point on the side wall 12 which is substantially upstream from the baffle 16.

Immediately downstream from the baffle 16 is positioned a screw-type impeller or pump means 20 which comprises a spiral blade on a shaft 21, rotatably powered, indicated by arrows on the drawings, by any preferred means, such as a geared electric motor drive (not shown). Immediately downstream from the pump 20 is a transverse wall 22 which is substantially the same length as and substantially parallel to the baffle 16. A longitudinally placed dam 23 extends between the end of the wall 22 and the baffle 16 and is substantially parallel to the side walls 12. The top surface 24 of the dam 23 is substantially the same height as the top surface 17 of the baffle 16. Such arrangement of the baffle 16, the wall 22, and the dam 23 in relation to the side wall 12 provides a pocket 19 in which the pump means 20 is positioned and through which all molten glass must travel.

The operation of the pump means 20 is such that it continuously stirs and mixes the molten glass as it flows through the pocket structure 19. The pump means raises the molten glass through the pocket 19 at a considerably greater rate than it is discharged through the forehearth outlet 11. As a result, only a portion of the molten glass which flows through the pocket structure 19 will flow over the top surface 24 of the dam 23. The rest of the molten glass flows back upstream over the top surface 17 of the baffle 16. Such arrangement serves the dual function of, first, preventing the flow of surface glass over the top surface 17 of baffle 16, and, second, continuously recirculating and stirring the molten glass to thoroughly mix the top and bottom glass to achieve the desired degree of homogeneity.

As an alternative construction in the pocket 19, arcuate refractory members 25 may be positioned in the angle corner at the juncture of the wall 22 with the side wall 12 and also in the angle corner at the juncture of the wall 22 with the dam 23 to define a substantially semi-cylindrical pocket structure and thereby eliminate areas in which the molten glass could become stagnated. A wall 26 is also positioned between the other side wall 12 and the juncture of the divergent wall 15 where it meets the baffle 16. A downstream divergent wall 27 is positioned between the side wall 12 and the juncture of wall 22 with dam 23 to provide a smooth flow channel for the molten glass after it leaves the pocket 19 and flows to the forehearth outlet 11.

Figure 4:
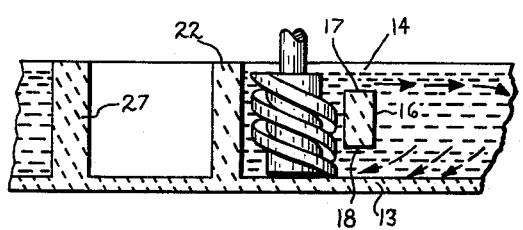
FIG. 4 is a sectional view taken through line 4—4 of FIG. 1.
Figure 3:
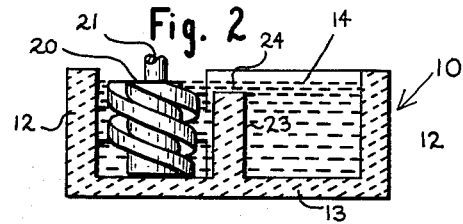
FIG. 3 is a sectional view taken through line 3—3 of FIG. 1.

In the operation of the invention, molten glass flows from a chamber of a glass melting furnace, such as a refining chamber (not shown), into the forehearth 10. The molten glass flows longitudinally along the channel of the forehearth until it reaches the baffle 16. By the time the molten glass reaches the baffle 16, the surface has generally cooled to a lower temperature than that of the rest of the glass, and the glass at the bottom and sides of the channel may have picked up small particles of refractory, which, if not thoroughly mixed in, could appear as a defect or flaw in a glass article formed from the glass. The lower portion of the molten glass flows under the bottom 18 of the baffle 16 into the pocket 19. There it is received by the pump means 20 which vigorously mixes it while causing it to flow upwardly. As the molten glass is elevated in the pocket, a small portion of it will flow over the dam 23 to maintain a level of glass in the outer end of the forehearth and continue to flow downstream to the forehearth outlet 11. The remainder of the glass treated by the pump means will flow back upstream over the top surface 17 of the baffle 16 and be eventually recirculated through the pocket 19 (FIG. 4). Inasmuch as the molten glass flows through the pocket 19 at a greater rate than it is discharged through the outlet 11, a considerable portion of it is continuously recirculated.

Figure 5:
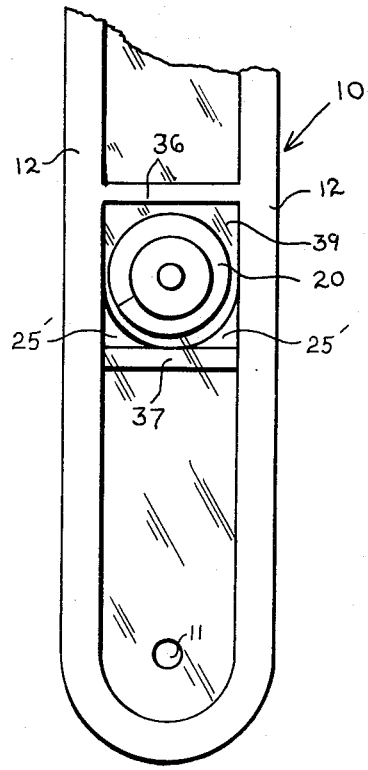
FIG. 5 is a plan view of a modified form of the apparatus of this invention.
Figure 2:
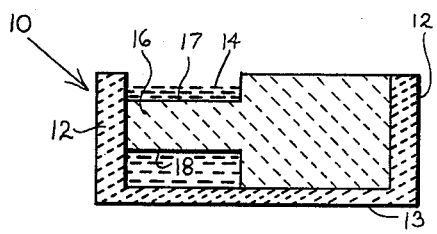
FIG. 2 is a sectional view taken through line 2—2 of FIG. 1.

There is shown in FIG. 5 a modification wherein the baffle extends the full width of the forehearth. This baffle 36 is similar to the baffle 16 of the previous example in that the lower edge of the baffle 36 is substantially above the bottom of the channel to permit the flow of molten glass thereunder. Likewise, the top of the baffle 36 is somewhat lower than the normal depth of the molten glass. There is also provided a dam 37 which is similarly related in the channel to the dam 23 with the exception that it is here positioned transversely across the channel between the side walls 12 of the forehearth 10. Thus, the baffle 36 and the dam 37 cooperate with a portion of the side walls 12 to define a pocket 39 in which is positioned the pump means 20. Similar arcuate refractory members 25′ may be positioned in the downstream corners of the pocket structure 39 so that it defines a substantially semi-cylindrical chamber to house the pump means. The structure of this embodiment of the invention permits the use of fewer obstructions in the channel of the forehearth and may be used when the forehearth is sufficiently narrow to permit the pump means 20 to nearly span its width. A similar structure may be used with a relatively wider forehearth by providing a plurality of screw-type impellers in the pocket to substantially span the width of the channel.

Thus, it can be seen that this invention provides an apparatus which is relatively simple and inexpensive to construct and which effectively recirculates and thoroughly mixes the molten glass while at the same time prevents the direct passage of either surface or bottom glass to the delivery outlet. Such recirculation and mixing results in molten glass providing a product that has relatively uniform temperature and a high degree of homogeneity as it is being fed to the delivery outlet.

It is obvious that numerous modifications will become readily apparent to those skilled in the art. It is, therefore, not the purpose of this disclosure to limit the scope of the patent granted hereon otherwise than as necessitated by the scope of the appended claim.

What is claimed is:

Apparatus for stirring, skimming and recirculating molten glass in a furnace forehearth having a channel for conveying molten glass, said apparatus comprising baffle means for restricting the downstream flow of all molten glass but that which is adjacent the channel bottom, said baffle having a lower edge spaced above the bottom of said channel and an upper edge below the surface of said molten glass, dam means positioned downstream from said baffle for restricting the flow of molten glass, said dam means abutting said channel bottom and extending upwardly therefrom to a point substantially equal to the height of said baffle upper edge, said baffle means and said dam means cooperating to form a pocket, stirring means positioned in said pocket for simultaneously stirring said molten glass and causing it to flow upwardly so that a portion of molten glass flows over the dam and the rest flows upstream over the top of the baffle for eventual recirculation through said pocket, and a glass delivery area downstream from said pocket.

References Cited by the Examiner

UNITED STATES PATENTS

| 246,109 | 8/81 | Fetters | 65—134 |
|---|---|---|---|
| 1,916,668 | 7/33 | Howard | 65—347 |
| 1,927,101 | 9/33 | Stenhouse | 65—134 |
| 2,238,800 | 4/41 | Mueller | 65—134 |
| 2,945,325 | 7/60 | Deible et al. | |
| 3,057,175 | 10/62 | Rough et al. | 65—178 |

DONALL H. SYLVESTER, *Primary Examiner.*